Jan. 28, 1947. W. S. REDHED 2,414,976
FLIGHT RECORDING INSTRUMENT
Filed June 30, 1941 5 Sheets-Sheet 2
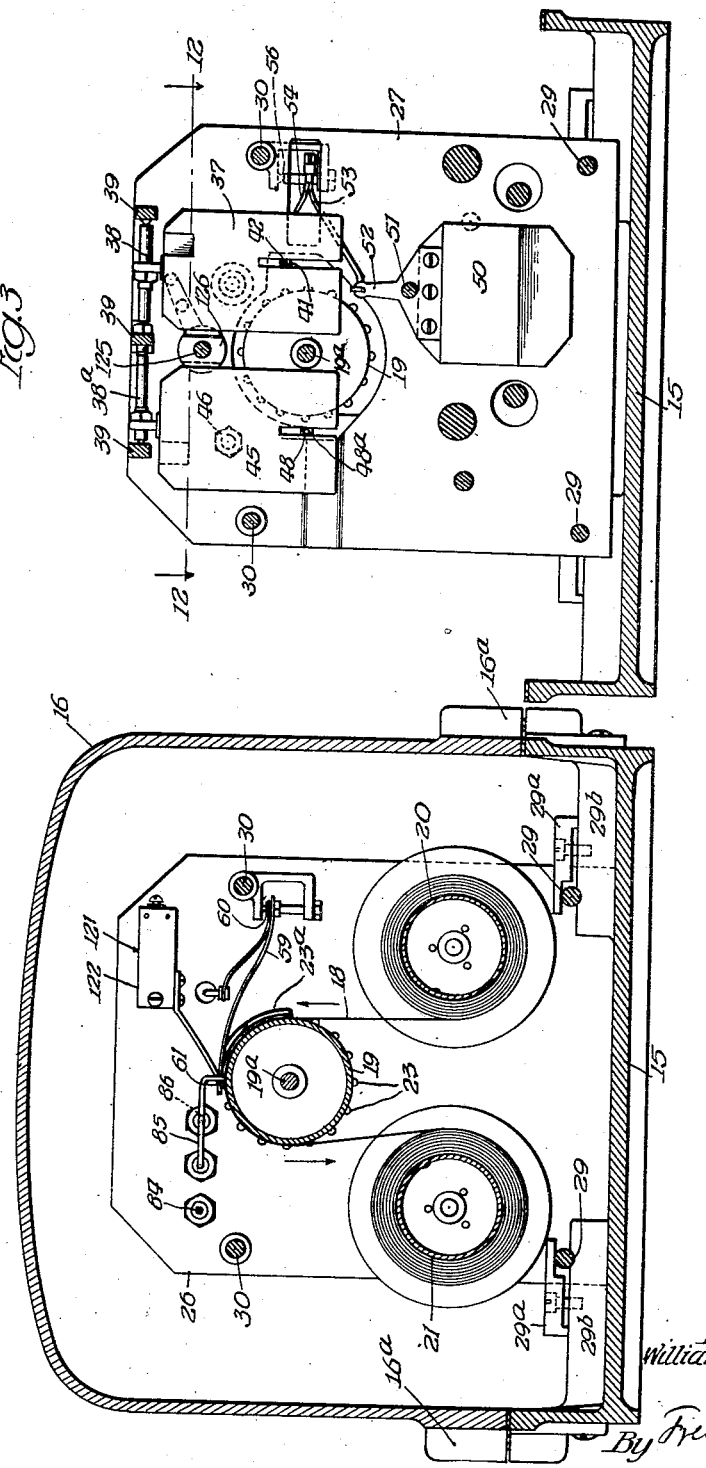
Inventor
William S. Redhed
By Fred Gerlach
his Atty

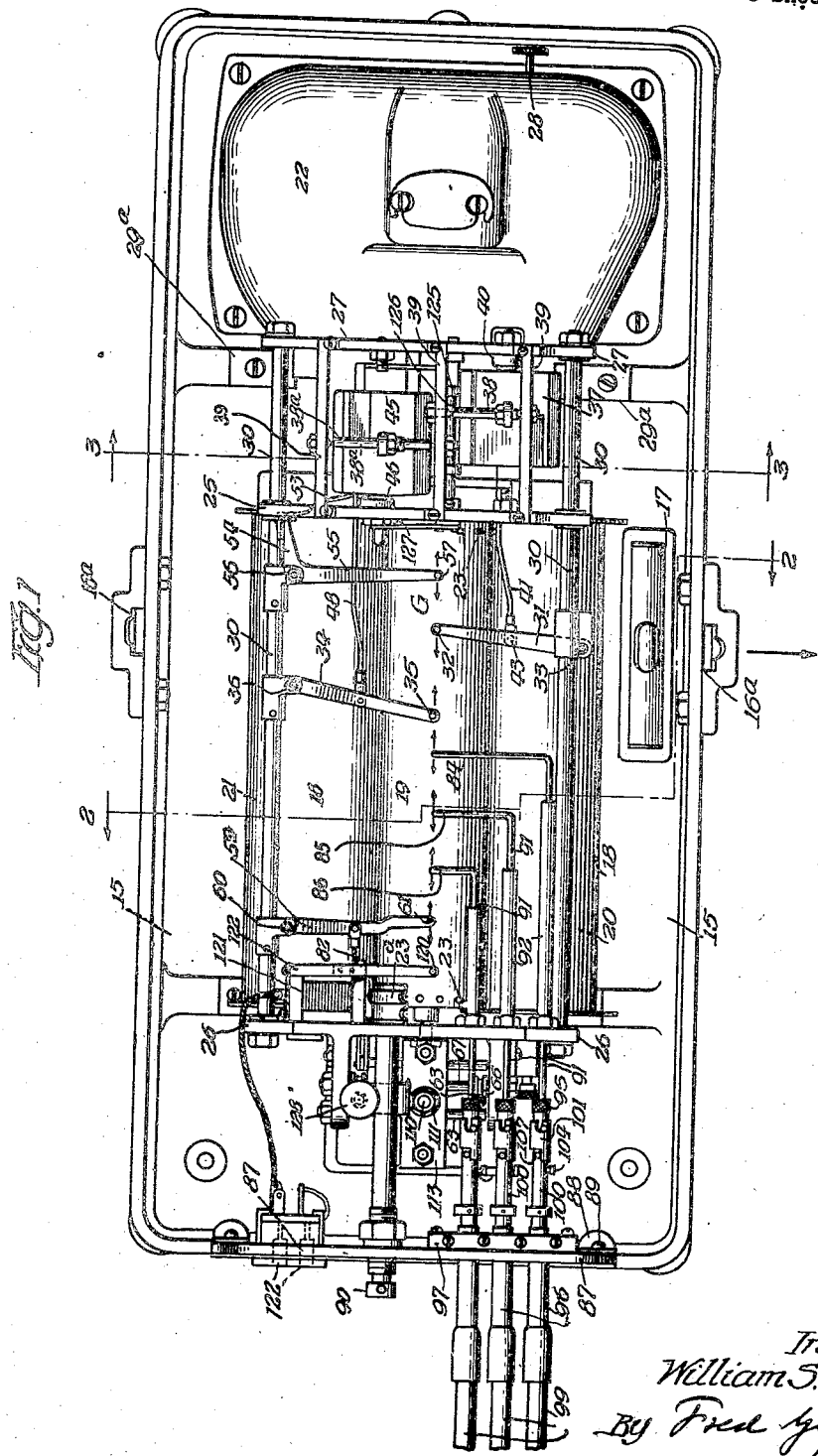

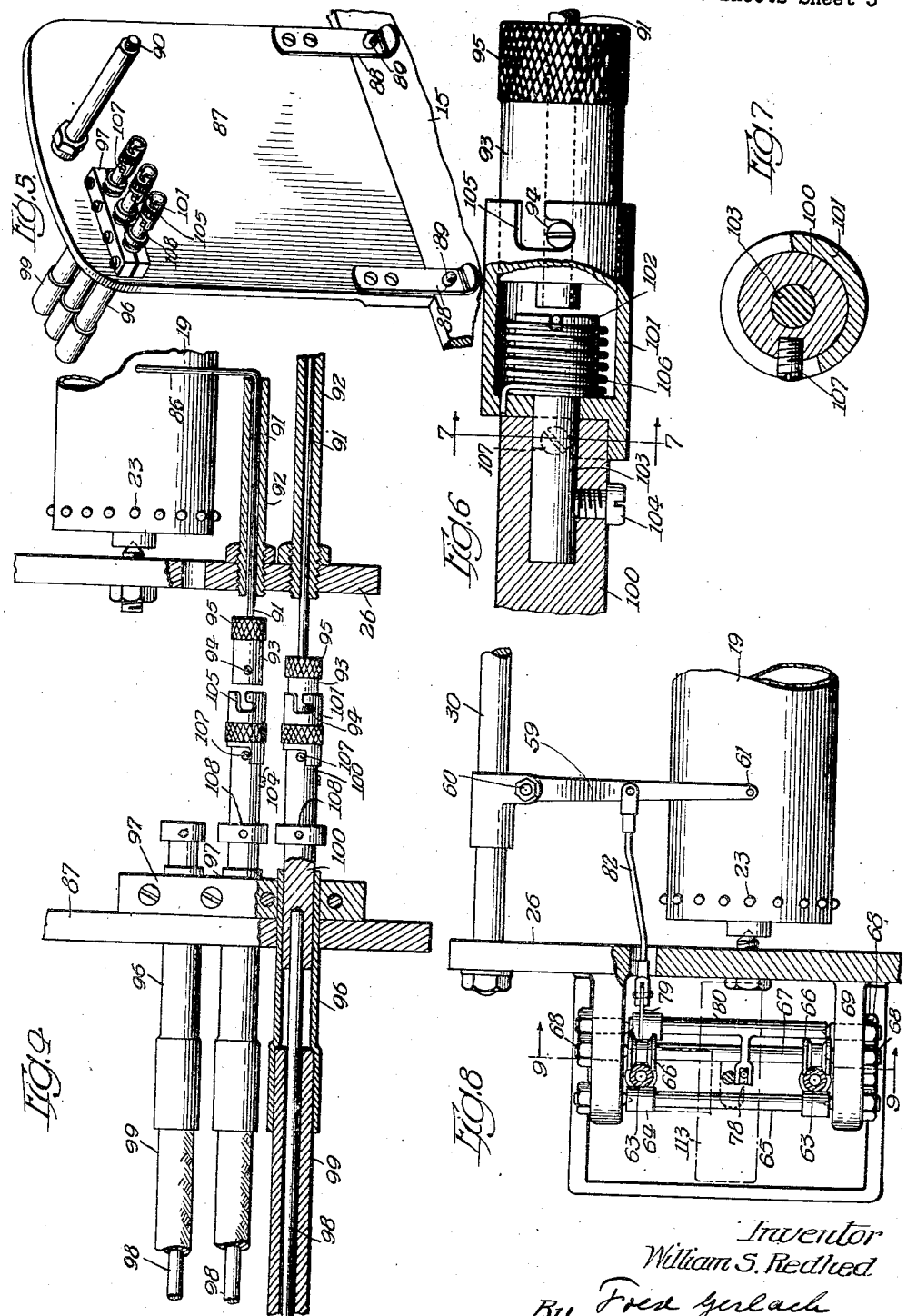

Jan. 28, 1947.  W. S. REDHED  2,414,976
FLIGHT RECORDING INSTRUMENT
Filed June 30, 1941  5 Sheets-Sheet 4
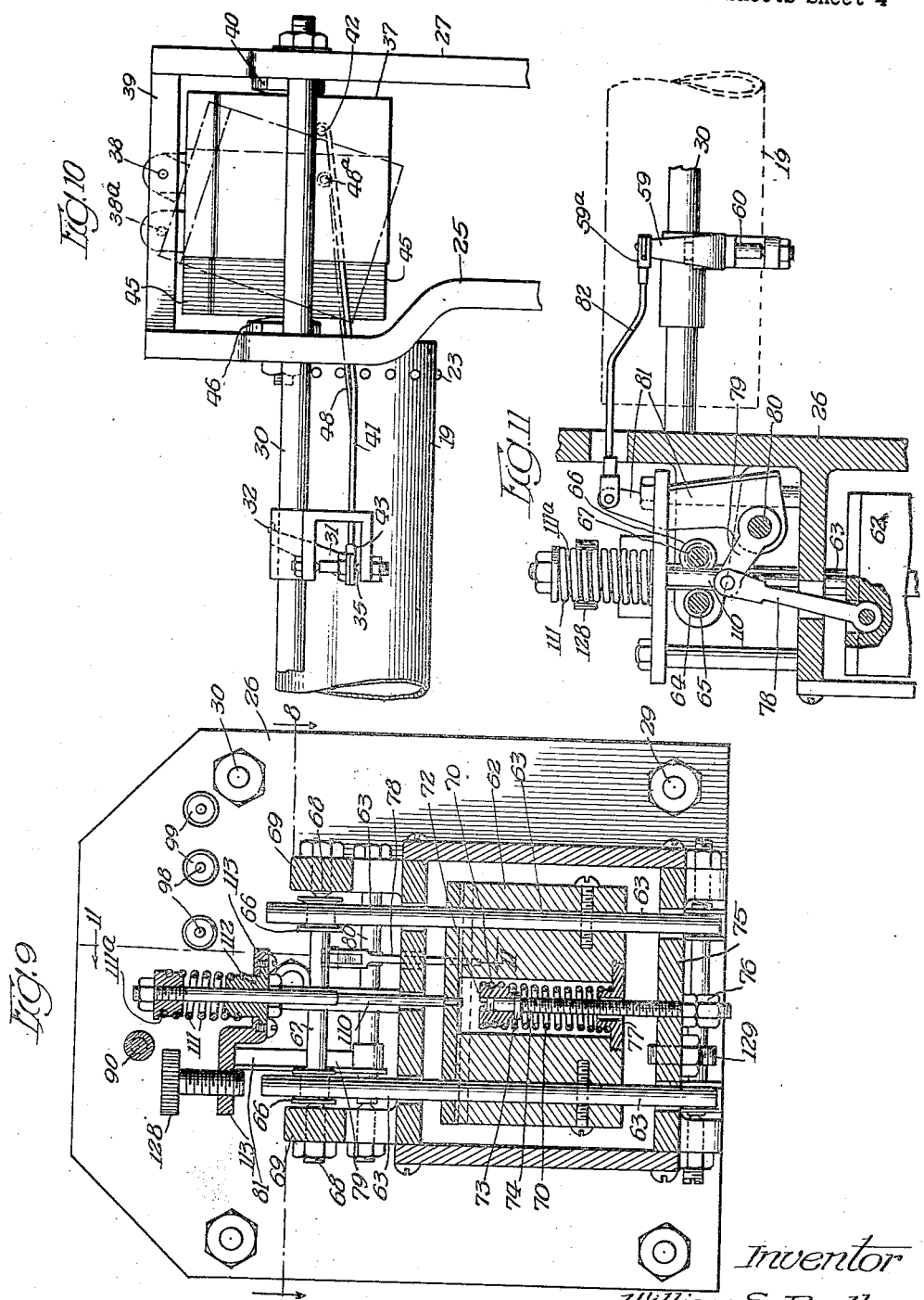
Inventor
William S. Redhed
By Fred Gerlach
his Atty.

Jan. 28, 1947. W. S. REDHED 2,414,976
FLIGHT RECORDING INSTRUMENT
Filed June 30, 1941 5 Sheets-Sheet 5
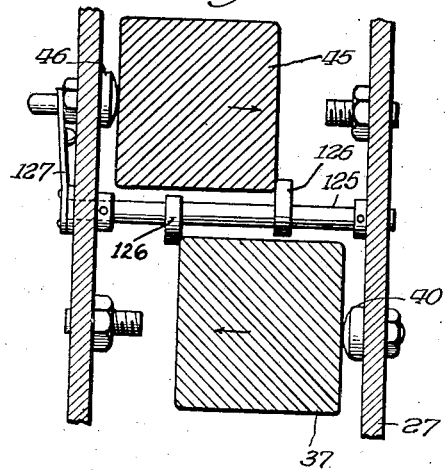
Fig. 12
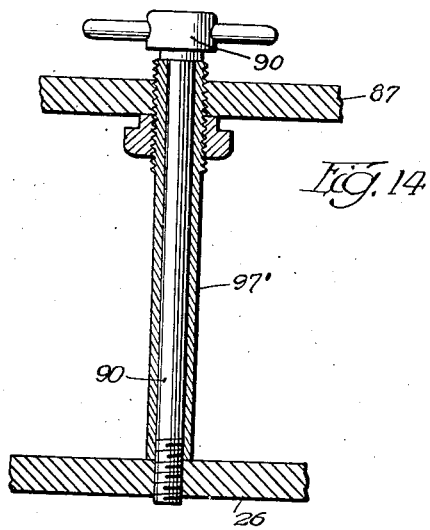
Fig. 14
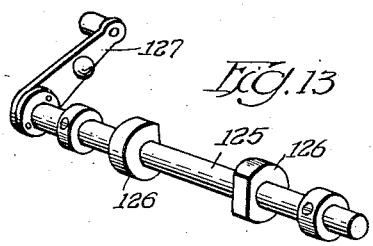
Fig. 13
Fig. 15
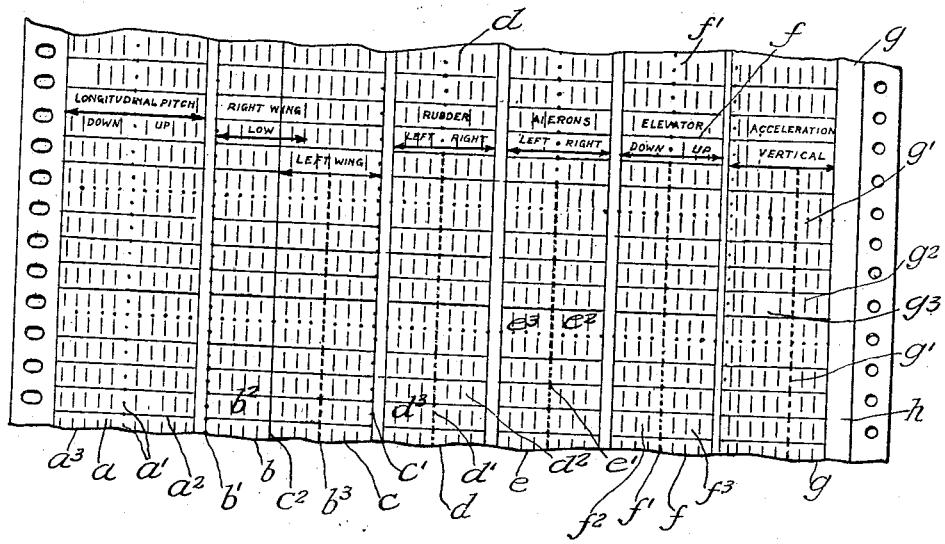
Inventor
William S. Redhed
By Fred Gerlach
his Atty.

Patented Jan. 28, 1947

2,414,976

UNITED STATES PATENT OFFICE 2,414,976

FLIGHT RECORDING INSTRUMENT

William S. Redhed, Champaign, Ill.

Application June 30, 1941, Serial No. 400,545

11 Claims. (Cl. 234—66)

The invention relates to instruments for recording the attitude, and the inclinations of the supporting and control surfaces of an airplane in flight, so that the manner in which the flight was conducted by the pilot can be ascertained.

The objects of the invention are to provide an instrument for recording on a chart: whether the inclination of the wings is such that when the airplane is banked in making turns or tilted transversely in flight, slippage or skidding occurs; the longitudinal pitch variations of the airplane during flight; the accelerations vertical to the base of the airplane during flight; and the movements of the rudder, ailerons and elevator during flight. From the chart on which are recorded the attitude, the inclinations of the airplane and the maneuvering of the supporting and control surfaces during flight, it can be ascertained whether the pilot, in maneuvering the airplane for lift and lowering, for flying at a level, in making turns, and in doing acrobatics, has been properly and efficiently controlling the airplane.

Another object of the invention is to provide a recording instrument which includes devices for recording the movements of the rudder, ailerons, and elevator, and a quickly and easily detachable mounting whereby the terminals of the control devices can be connected to the recording instrument so that the instrument can be conveniently removed from the airplane while said terminals remain connected to the controls. This permits the easy removal of the instrument from one plane and its easy installation in another plane, and the ready substitution of one recording instrument for another in the airplane for the use of individual pilots, or for examination or repair.

Other objects of the invention will appear from the detailed description.

The invention consists in the several novel features which are hereinafter set forth and are more particularly defined by claims at the conclusion hereof.

In the drawings: Fig. 1 is a plan of an instrument embodying the invention, the cover of the enclosing case being removed. Fig. 2 is a section taken on line 2—2 of Fig. 1. Fig. 3 is a section taken on line 3—3 of Fig. 1. Fig. 4 is a plan, parts being shown in section, illustrating the couplings between the airplane controls and the recording instrument. Fig. 5 is a perspective of the mounting plate which is detachable from the instrument and carries the coupling members which are connected to the airplane controls. Fig. 6 is a detail section of one of said couplings. Fig. 7 is a section taken on line 7—7 of Fig. 6. Fig. 8 is a vertical section on line 8—8 of Fig. 9. Fig. 9 is a section taken on line 9—9 of Fig. 3. Fig. 10 is a side view of the pendulums for recording transverse inclinations of the airplane. Fig. 11 is a section taken on line 11—11 of Fig. 9. Fig. 12 is a horizontal section on line 12—12 of Fig. 3. Fig. 13 is a detail perspective of the locking device for the pendulums which operate the recording devices for transverse inclinations of the airplane. Fig. 14 is a detail section of the device for locking the mounting plate for the terminals of connections to the airplane controls to the frame which supports the recording mechanism. Fig. 15 is a plan of the chart used for recording the movements of the several devices which are responsive to the longitudinal pitch, transverse inclinations, vertical acceleration, and the airplane controls.

The invention is exemplified in a recording instrument which is enclosed in a portable case for transportation. The case comprises a base 15 and a cover 16, which is removably secured to the base by latches 16a. The case may be placed in any convenient location, usually close to the pilot's seat. The case is positioned in the airplane so the axis of the drum for advancing the chart extends transversely of the airplane, and the base is truly level when the longitudinal and transverse axes of the airplane are level. A spirit level 17 is provided in the front of the case to facilitate the correct placement of the instrument.

The recording mechanism is supported by a frame which comprises plates 25, 26 and 27 which are rigidly secured in spaced relation by lower rods 29 and upper rods 30 which extend through said plates. This frame is removably secured to the base 15 by clamps 29a (Fig. 2) which engage the lower rods 29.

The instrument comprises a drum 19 which is adapted to advance the chart 18 and move it under the several styli hereinafter described for marking the chart for recording purposes. The chart consists of a web or sheet, the top of which passes over the drum 19 from a supply-spool 20 to a take-up spool 21. The drum is provided with teeth 23 at its ends for entering rows of perforations along the margins of the sheet to positively advance the web. A guide 23a holds the chart against the periphery of the drum 19. The drum 19 is mounted between frame-plates 25 and 26 and fixed to a shaft 19a which is journaled in plates 26 and 27.

A spring motor 22 is mounted on and adjacent one end of the base 15 and endwise of the plate 27 of the supporting-frame and is adapted to drive shaft 19ª of the drum 19 to advance the chart at a predetermined constant speed. For example, a 480-beat spring clock mechanism may be used which, through suitable gearing, will rotate drum 19 to advance the chart 18 at the rate of 1½ inches per minute, or at any other suitable predetermined rate. This motor is also suitably connected to drive the take-up spool 21 through a friction clutch. A suitable device, such as a button 28, controls the starting and stopping of the motor 22. The spring clock and gearing per se are not a part of the invention and therefore have not been illustrated and described in detail.

The instrument comprises a pair of devices for marking the chart 18, and which are responsive to transverse inclinations of the airplane during flight. One of said devices comprises a pendulum 37 which is suspended from and fixed to a rod 38 which is pivotally supported by fixed bars 39 which extend between frame-plates 25 and 27. The axis of rod 38, on which pendulum 37 swings, is parallel to the longitudinal axis of the air plane so that the pendulum can swing responsively to transverse inclinations of the airplane during which the right wing is lowered and the left wing raised. A stop 40 on frame-plate 27 is engaged by pendulum 37 when the latter is in normal position, that is, when the airplane is level transversely. The pendulum 37 engages stop 40 by gravity and is free to swing to the right when the right-hand wing is inclined downwardly. A stylus 32 is secured to the distal end of an arm 31, whch is, at 33, pivotally supported to swing longitudinally of the drum 19, in a bracket secured to one of the upper frame-rods 30. A link 41 is pivotally connected at 42 to pendulum 37 and at 43 to the arm 31 for moving the stylus 32 on the chart 18 longitudinally of the drum 19 proportionately to the movement of the pendulum 37. The pendulum 37 will operate the stylus 32 and record movements of said pendulum.

The other of said devices comprises a pendulum 45 which is suspended from and fixed to a rod 38ª which is pivotally supported by fixed bars 39 which extend between frame-plates 25 and 27. The axis rod 38ª, on which pendulum 45 swings, is parallel to the longitudinal axis of the airplane so that the pendulum can swing transversely of the airplane. A stop 46 on frame-plate 25 is engaged by pendulum 45 when it is in normal position, that is, when the airplane is level transversely. The pendulum engages stop 46 by gravity and is free to swing toward the left side of the airplane when the left-hand wing is inclined downwardly and the right wing is raised. A stylus 35 is secured in the distal end of an arm 34, which is pivotally supported at 36, to swing longitudinally of drum 19, in a bracket secured to one of the upper frame-rods 30. A link 48 is pivotally connected at 48ª to pendulum 45 and to the arm 34 and moves the stylus 35 on the chart 18 longitudinally of the drum 19 proportionately to the movement of the pendulum 45. The pendulum 45 will operate the stylus 35 to record the movements of said pendulum. When the airplane is level transversely, the pendulums 37, 45 will be held by gravity in their normal positions and be arrested by stops 40, 46, respectively. During downward inclination of the airplane at the right side when making a right-hand turn, the pendulum 45 is held by gravity against its stop 46 and pendulum 37 is free to swing away from its stop 40. If the airplane is properly banked for a predetermined right-hand turn, pendulum 37 will be subjected to sufficient centrifugal force to overcome its gravity and will hold said pendulum against its stop 40 so that the stylus 32 will not move across the chart. If the predetermined right-hand turn is made with the right wing too low, the centrifugal force acting on pendulum 37 will be insufficient to overcome its gravity and said pendulum will move the stylus 32 and record its movement on chart 18. The degree of movement of the pendulum 37 will vary responsively to the deficiency of the centrifugal force and degree of slipping. As a result, whenever a slip to the right occurs during a right-hand turn, the pendulum 37 will move stylus 32 proportionately to the degree of movement of the pendulum away from its stop 40 and the record on the chart will indicate that the attitude of the right-hand wing was too low and the scole on the chart will indicate how many degrees the right wing was too low. If however the predetermined right-hand turn is made with the left wing too low the centrifugal force acting on pendulum 45 will be sufficient to overcome its gravity and the said pendulum will move stylus 35 which will record the movement of said pendulum on chart 18. The degree of movement of the pendulum 45 will vary responsively to the centrifugal force and the degree of skidding. As a result, whenever a skid to the left occurs during a right-hand turn, the pendulum 45 will move the stylus 35 proportionately to the degree of the movement of the pendulum and the record on the chart will indicate that the attitude of the left-wing was too low and will indicate on a scale on the chart how many degrees too low the left wing was. When the airplane is properly banked for making a predetermined left-hand turn, the centrifugal force exerted on the pendulum 45 by the banking of the airplane will overcome its gravity and hold it against stop 46 and no movement of the pendulum will be recorded on the chart 18. In the event that the airplane is not properly banked during a left-hand turn as the result of a too low left wing, the centrifugal force will be insufficient to hold said pendulum against its stop, and the pendulum will swing downwardly. The stylus 35 will be operated to record the extent of movement of pendulum 45, from which it can be determined that a slip to the left side was caused during the left-hand turn as the result of the left wing being too low for a properly banked left-hand turn. In the event that the airplane is not properly banked during a left-hand turn as a result of a too low right wing the centrifugal force will be insufficent to hold pendulum 37 against its stop and the pendulum will swing downward. The stylus 32 will be operated to record the extent of the movement of pendulum 37 from which it can be determined that a skid to the right side was caused during the left-hand turn as a result of the right wing being too low for a properly banked left-hand turn.

A slip during a right-hand turn causes the same pendulum to move as does a skid during a left-hand turn. Consequently in order to determine whether the plane has slipped or skidded during a turn it is necessary to determine whether the turn was to the right or to the left. This information may be obtained by consulting the records of the rudder and ailerons which are also automatically recorded on the same chart as hereinafter described.

As an example, under static conditions the lengths of the records produced by inclining the pendulum 37, 45 laterally are:

| Length of record | Amount of lateral angle |
|---|---|
| | Degrees |
| 0.10″ | 2 |
| 0.20″ | 4 |
| 0.30″ | 6 |
| 0.40″ | 8 |
| 0.50″ | 10 |
| 0.60″ | 12 |
| 0.70″ | 14 |

The rudder and aileron movements are automatically recorded as hereinafter described and, by comparison of these records with the records produced by the styli 32, 45, it may be determined whether the airplane slipped or skidded, and the cause of such skidding or slippage or improper turn can be ascertained.

The instrument also includes a device for recording the pitch or longitudinal inclinations of the airplane and sudden longitudinal accelerations during flight. This device comprises a pendulum 50 (Fig. 3) which is pivotally supported by a pin 51 which is supported in frame-plates 25, 27. This pendulum is free to swing by gravity forwardly or backwardly from its vertical position and longitudinally of the longitudinal axis of the airplane. An upwardly extending arm 52 on the pendulum 50 is connected by a link 53 to an arm 54 on a recording arm 55 which is pivotally supported at 56 and is provided with a stylus 57 for marking the chart 18. This device under static conditions may produce records of longitudinal inclinations, as follows:

| Length of record | Longitudinal angle |
|---|---|
| | Degrees |
| 0.10″ | 7 |
| 0.20″ | 14 |
| 0.30″ | 22 |
| 0.40″ | 31 |
| 0.50″ | 42½ |

While the airplane is longitudinally level in flight the recording arm 55 will produce a straight longitudinal mark on the chart 18. When the plane is pitched longitudinally downward, pendulum 50 will swing forwardly and operate link 53 to swing recording arm 55 to the left from its normal position to record the downward pitch on the chart. When the airplane is pitched upwardly pendulum 50 will swing backwardly from its normal position and shift link 53 to swing recording arm 55 from its normal position to the right to record the degree of such pitch and the duration of it. The pendulum 50 will also be moved by sudden longitudinal accelerations and operate the recording arm 55 to record such accelerations on the chart 18. This exemplifies a recording device for the longitudinal pitch and accelerations occurring during the maneuvering of the airplane.

The instrument also includes a device which records vertical accelerations or the smoothness with which the airplane is maneuvered. This device comprises a recording arm 59 which is pivotally supported at 60 and carries a stylus 61 for marking the chart 18 and which is operated responsively to a weight 62. Said weight has secured thereto a pair of rods 63. The upper ends of rods 63 are guided between rollers 64 on a shaft 65 and grooved sheaves 66 on a shaft 67. Shafts 65 and 67 are rotatably supported by adjustable bearing-pins 68 in lugs 69 on frame-plate 26. The lower ends of rods 63 are similarly guided for vertical rectilinear movement of the rods. A pull-spring 70 is applied to weight 62 to hold it in a normal predetermined position. The upper end of spring 70 has a screw connection with a collar 72. The lower end of collar 72 engages an annular shoulder 73 on a screw-threaded post 74. Post 74 extends through a wall 75 integral with the frame-plate 26 and is provided with nuts 76 at its lower end whereby the position of the shoulder 73 may be adjusted to vary the tension of the spring 70. The lower end of spring 70 has a screw connection with an abutment collar 77, which is secured to the lower end of weight 62 so that said spring will normally hold the weight raised. The upper end of weight 62 normally engages a shoulder on the lower end of a rod 110. A spring 111 has its upper end screwed to a collar 111a which is adjustably secured to rod 110 and has its lower end screwed to a collar 112 which is fixed in a member 113 of plate 26. Spring 111 resists upward movement of weight 62 from its normal position but does not press it below such position. Weight 62 (Fig. 11) is connected to recording arm 59 by an upstanding forked link 78, the lower end of which is pivotally connected to said weight, an arm 79 fixed to a shaft 80 which is journaled in the lugs 69, an arm 81 fixed to shaft 80 and a link 82 which is pivoted to arm 81 and to recording arm 59. The movement of the stylus 61 produced by the weight 62 may be at the ratio of 10 to 1. Spring 70 is loaded so it will be compressed, for example .05″, and spring 111 is then extended to its free length without pressure against the weight. Spring 70 may have a static load of 1.00G and an additional static load of .20G is required to produce each .10″ of movement of the stylus. The static load of .20G will produce each additional .10″ of movement of the stylus and indication on the chart 18. The maximum record of 1″ is produced by a static load of 2.00G. When the airplane is flying, any upward movement, as the result of abrupt acceleration, will cause weight 62 to move downwardly against the force of spring 70 and operate the recording arm 59 across the chart from its normal position to the left in Fig. 1. When downward movement results in any abrupt deceleration, weight 62 will be pressed against the force of spring 70 and the weight will operate stylus 61 to the right in Fig. 1. When the airplane is not in a horizontal position, and making a turn, centrifugal force may also shift the weight 62 downwardly so that a record will be produced of that acceleration or centrifugal tendency. This exemplifies a device comprising a spring-loaded weight for recording accelerations vertical to the base of the airplane and the smoothness of the operation of the airplane.

The instrument also includes a stylus carrying-arm 84 for recording on chart 18 the movements of the rudder to the right or left from normal position; a stylus carrying arm 85 for recording the movements of the ailerons for right or left-hand turns; and a stylus carrying-arm 86 for recording the up or down movements of the elevator. Each of these styli is operated from the controls for the rudder, ailerons and elevator, respectively. In practice, it is desirable to remove the recording instrument from the airplanes so that the recordations for the flying of each pilot may be made on separate charts or when it is not desired to use the recording instrument during a flight. It is desirable to facilitate the connection of the recording instrument to, and its disconnection from, the terminals of the operating connections with control devices for the rudder, ailerons, and elevator. The invention provides detachable couplings between the arms 84, 85 and 86 and the terminals of the connections for the control devices. These terminals are mounted in a plate 87 (Fig. 5) which is readily connectable to and removable from one end of the casing. Plate 87 has secured thereto clips 88 which are adapted to engage studs 89 on the base 15 of the case, is fitted into an opening in one end of the case-cover 16, and is adapted to be removably secured to the case by a screw 90 which extends through a sleeve 97' and screws into the frame-plate 26 (Fig. 14).

The couplings for the arms 84, 85 and 86 are alike in construction so that a description of one is applicable to all. Each of said arms is formed of a wire and has a shaft 91 which extends transversely of the airplane and is slidably mounted in a bearing sleeve 92 which is screw-threaded into the frame-plate 26 and fixedly held therein (Fig. 4). The outer end of each shaft 91 has fixed thereto a sleeve 93 which carries a screw-stud 94 on its outer periphery and is provided with a knurled gripping portion 95. Sleeve 93 constitutes a coupling member which remains connected to the recording instrument for slidably moving shaft 91 longitudinally of the drum 19 to move the stylus carried thereby across the chart and longitudinally of the drum. The other coupling-members which are connected to the control-devices are carried by the removable plate 87. Sleeves 96 extend through said plate and are secured in fixed relation thereto by a clamp 97 which is adapted to clamp all of the sleeves and secure them to said plate. A flexible rod 98 is connected to each control device and is guided in a sheath 99 which is secured in the outer end of a sleeve 96. This form of connection may be of the type usually known as the "Arens" control. The inner end of each wire 98 has secured thereto a shaft 100 which is slidable in a sleeve 96. A coupling sleeve 101 is connected to the inner end of shaft 100 by the head 102 of a stud 103 which is fixedly secured in shaft 100 by a screw 104. Sleeve 101 has a wall confined between the inner end of shaft 100 and the head 102 of stud 103 which holds the sleeve 101 against endwise movement and permits said sleeve 101 to rotate relatively to shaft 100. The inner end of sleeve 101 is provided with an angular slot 105 which, with screw 94 on sleeve 93, forms a bayonet-catch for detachably coupling sleeve 93 to the sleeve 101. A coil-spring 106 has one of its ends connected to sleeve 101 and its other end connected to the head 102 of stud 103. Spring 106 is wound to rotate sleeve 101 and shaft 91 in the direction which will press the arm which carries the stylus toward the chart 18 over drum 19. The pressure from spring 106 is applied through screw 94 to sleeve 93. This spring also permits sleeve 101 to be rotated relatively to sleeve 93 to bring the screw 94 into alignment with the open end of slot 105 so that sleeve 93 can be withdrawn from sleeve 101 for coupling or uncoupling said sleeves together for conjoint axial movement. A stop-pin 107 is secured to shaft 100 to limit the rotation of sleeve 101 when it is uncoupled from sleeve 93. The wire 98 which operates the coupling device for stylus arm 84 is connected to the rudder control element in any suitable manner and is adapted to shift said arm from normal position to the right or the left in accordance with the direction and movement of the rudder. The wire 98 for operating the stylus arm 85 is connected to the device for controlling the movement of the ailerons in accordance with the direction and extent of movement of the ailerons from normal position to the right or left responsively to the operation of the control for right or left-hand turns. The wire 98 for operating the stylus-arm 86 is connected to the control device for the elevator so as to shift said arm from its normal position to the right or left according to the direction and extent of movement of the elevator. The connections between wires 98 and the control devices may be of any suitable construction for longitudinally shifting them in accordance with the movements aforesaid. In many instances, it is desirable to allot the use of the instrument to an individual pilot and to connect the instrument to, and disconnect it from, the control device, when the pilot commences and completes a flight or flights. The cover-plate 87 remains attached to the terminals of the control devices at all times and when the recording instrument is to be coupled thereto for use, plate 87 is secured to the base 15 of the case and to the frame-plate 26 by screw 90. Each coupling sleeve 101 is then rotated to bring the open end of its slot 105 into position to receive the screw 94 on the sleeve 93. Each sleeve 93 is then slidably shifted into said slot and when the sleeve 101 is released, spring 106 will be rotated to lock the screw 94 in the slot (Fig. 6). The sleeves of each coupling will then be coupled together for longitudinal sliding movement and sleeve 101 will, through screw 94 and spring 106 apply sufficient rotative pressure to shaft 91 for pressing the stylus thereon into contact with the chart 18. At the end of a run, the coupling sleeves 101 may be reversely rotated so that sleeves 93 can be disconnected from sleeves 101. Screw 90 will then be disconnected from frame-plate 26 while the plate 87 in which the sleeves 96 are supported, can be completely detached from the case. A stop-collar 108 is secured to each shaft 100 to limit the movement of the shaft into sleeve 96 when plate 87 is disconnected from the instrument. The tension of spring 106 can be adjusted by the rotative adjustment of stud 103 on shaft 100. This exemplifies detachable couplings for the stylus carrying arms 84, 85 and 86 which respectively comprise a mounting for the coupling members which remains connected to the controls when the plate 87 is detached from the recording instrument so that said plate and the connections with the controls may be left permanently installed in the airplane and permits the recording instrument to be detached and removed and readily connected to the control devices for recording the movements of the rudder, ailerons and elevator.

In some instances, it is desirable to record telegraphic messages received or transmitted on the chart. For this purpose, a stylus 120 is adapted to record, by dot-and-dash code, such messages through a magnet 121 which is mounted at the inner side of frame-plate 26 and comprises an armature 122 which carries an arm on which the stylus 120 is mounted. Current can be supplied to the magnet 121 through conductors which may be connected to the magnet by the usual plug-socket 122.

When the instrument is not being used to record the attitudes of the plane during a flight, it is desirable to lock the pendulums 37 and 45 so that the styli shifted thereby will not mark the chart 18. For this purpose a shaft 125 journaled in frame-plates 25 and 27 is provided with a pair of stops 126 which are adapted to lock the pendulums 37, 45, respectively, against their respective stops. A handle 127 is fixed to shaft 125 so that said stops can be rotated so they will be cleared by the pendulums respectively or shifted into their path to arrest their movement away from their stops. A screw 128 (Fig. 9) is adapted to be turned to engage the upper end of one of the rods 63 when it is desired to prevent movement of the weight 62. The screw 128 can be turned downwardly to force the weight 62 against the force of spring 70 and to engage a limit-stop 129 so that said weight will be locked against vertical movement. The normal direction of the longitudinal axis of the airplane and its direction of travel are indicated by the arrow shown in Fig. 1.

In the operation of the recording instrument, assuming it to be connected to the control devices, as before described, the handle 127 will be shifted to release the pendulums 37 and 46 for lateral movement. Screw 128 will be turned to release weight 62. The spring-motor 22 will be started when a record is to be made and will continuously rotate the drum 19 and advance the chart 18 at a constant speed. The chart 18, as illustrated in Fig. 15, is divided into longitudinal zones for the markings produced by the respective styli, including a zone $a$ with a central longitudinal line $a'$ corresponding to the normal position of the stylus 57 with spaces $a^2$, $a^3$ at the sides thereof for the movements of said stylus to record the upward and downward pitch, respectively, of the airplane; a zone $b$ with a line $b'$ corresponding to the normal position of the stylus 32 and a space $b^2$ between line $b'$ and a line $b^3$ for recording maximum recordable lowness of the right wing in making turns; a zone $c$ partially overlapping zone $b$ with a line $c'$ corresponding to the normal position of stylus 35 and a space between line $c'$ and a line $c^2$ for indicating the movements of said stylus to record maximum recordable lowness of the left wing in making the turns; a zone $d$ with a line $d'$ corresponding to the normal position of the stylus on arm 64 and spaces $d^2$, $d^3$ for recording the right and left movements, respectively, of the rudder of the airplane; a zone $e$ with a central line $e'$ corresponding to the normal position of the stylus on arm 85 and spaces $e^2$, $e^3$, at the sides thereof for recording the movements of the ailerons; a zone $f$ with a central line $f'$ corresponding to the normal position of the stylus on arm 86 which is connected to the elevator and spaces $f^2$ and $f^3$ for recording the up and down movements of the elevator, respectively; a zone $g$ with a central line $g'$ for indicating the normal position of the stylus 61 and spaces $g^2$, $g^3$ at the sides thereof for recording the up-and-down accelerations recorded by said stylus; and a zone $h$ for recording the movements of the stylus 120. When the airplane is properly banked in making right or left-hand turns, gravity will hold one of the pendulums 37, 45 against its stop and in its normal position and centrifugal force will hold the other pendulum in its normal position and against its stop so that the styli 32 and 35 will not be moved laterally. If, however, in making a turn, the inclination of the wings is so great that skidding or slippage results, the pendulum which is free to gravitate away from its stop will not be subjected to sufficient centrifugal force to cause it to remain engaged with its stop and, as a result, the stylus arm to which that pendulum is connected, will be operated so the chart will be marked by the stylus to indicate that either the right wing or the left wing was too low for making a properly banked turn and a record will be made of the attitude of the plane during the turn. From that, it can be ascertained whether the pilot, in making turns, carried out the maneuver with either the right wing or the left wing too low. From the records of the movements of the aileron and rudder control devices on the chart, the cause of the improper banking can be ascertained. The pendulum 50 will move in accordance with the pitch or longitudinal inclination operate the stylus-arm 57 to record on the chart the longitudinal attitude or pitch of the airplane during flight. From the record of the elevator control device produced by the stylus-arm 86 on the chart, the maneuvering for pitch change during flight can be ascertained. Sudden vertical accelerations will produce movements of the slidable weight 62 and such movements will be recorded on the chart by the stylus 61 on arm 59. From the record produced by stylus 61 the abrupt vertical accelerations or decelerations during flight can be determined. The stylus-arm 84 will be shifted transversely of the chart to record the rudder movements during the flight. The stylus-arm 85 will be shifted across the chart to record the movements of the ailerons so that the aileron movements during flight can be determined. The stylus-arm 86 will record on the chart 18 the movements of the elevator. In this manner the record of the attitude of the airplane while in flight and all of the maneuvers during the flight will be recorded and from the record it can be determined whether the attitude of the plane was properly maintained or the maneuvers were improperly carried out as the result of manipulation of the controls.

The instrument provides records of the lateral angle of a plane with the horizontal when the plane is in curved flight, and measures and records at the same time acceleration vertical to the base and the angle between the plane and the proper angle of bank, regardless of speed and radius of curve. Acceleration vertical to the base is read in terms of gravity and the amount the plane is underbanked or overbanked is read in degrees, and by combining known mathematical formulas with this information the lateral angle of the plane at any such time may be determined.

The invention is not to be understood as restricted to the details set forth, since these may be modified within the scope of the appended claims, without departing from the spirit and scope of the invention.

Having thus described the invention, what I claim as new and desire to secure by Letters Patent is:

1. An instrument for recording the vertical movements of an airplane in flight, comprising means for supporting a movable chart, mechanism for advancing the chart, a vertically movable weight, springs between which the weight is held in its normal position and loaded to permit up or down movements of the weight when the vertical movement is checked in opposite directions, a device operable by the up and down movements of the weight for recording its movements on the chart and means for simultaneously recording on the chart the setting of the vertical control surfaces during such checking of the vertical movements.

2. In an instrument for recording the movements of the control surfaces of an airplane in flight, the combination with recording mechanism comprising a drum for supporting a movable chart, a set of styli for marking the chart, a supporting frame for the recording mechanism, slidable shafts carrying the styli respectively and movable longitudinally of the drum, of a mounting plate, means for detachably securing the mounting plate in fixed relation to the frame, a set of shafts slidably supported in the mounting plate and shiftable respectively by a set of airplane control devices, and couplings between the stylus-carrying shafts and the shafts carried by the mounting plate respectively, each coupling comprising a member fixed to one of the stylus-carrying shafts and a member supported by one of the shafts supported in the mounting plate, and a device for detachably locking the coupling members together for axial movement, the mounting plate and shafts supported thereby being removably connected to the frame for disconnection of the control device from the instrument when the couplings are disconnected.

3. In an instrument for recording the movements of the control surfaces of an airplane in flight, the combination with recording mechanism comprising a drum for supporting a movable chart, a set of styli for marking the chart, a supporting frame for the recording mechanism, slidable shafts carrying the styli respectively, and movable longitudinally of the drum, of a mounting plate, means for detachably securing the mounting plate in fixed relation to the frame, a set of shafts slidably supported in the mounting plate and shiftable respectively by a set of airplane control devices, and couplings between the stylus-carrying shafts and the shafts carried by the mounting plate respectively, each coupling comprising a sleeve fixed to one of the stylus-carrying shafts and a sleeve supported by one of the shafts supported in the mounting plate, and a bayonet-catch for detachably locking the sleeves together for axial movement, the mounting plate and shafts supported thereby being removably connected to the frame for disconnection of the control device from the instrument when the couplings are disconnected.

4. In an instrument for recording the movements of the control surfaces of an airplane in flight, the combination with recording mechanism comprising a drum for supporting a movable chart, a set of styli for marking the chart, a supporting frame for the recording mechanism, slidable shafts carrying the styli respectively and movable longitudinally of the drum, of a mounting plate, means for detachably securing the mounting plate in fixed relation to the frame, a set of shafts slidably supported in the mounting plate and shiftable respectively by a set of airplane control devices, and couplings between the stylus-carrying shafts and the shafts carried by the mounting plate respectively, each coupling comprising a member fixed to one of the stylus-carrying shafts and a member supported by one of the shafts supported in the mounting plate, and a device for detachably locking the coupling members together for axial movement, the mounting plate being removably connected to the base and frame for disconnection of the controls from the instrument when the couplings are disconnected, and springs for rotatably pressing the stylus-carrying shafts to engage the chart.

5. In an instrument for recording the movements of the control surfaces of an airplane in flight, the combination with recording mechanism comprising a drum for supporting a movable chart, a stylus for marking the chart, a supporting base and frame for the recording mechanism, and a slidable stylus-carrying shaft mounted in the frame to slide longitudinally of the drum, of a mounting plate, means for detachably securing the mounting plate in fixed relation to the base and frame, a shaft slidably supported by the mounting plate and shiftable by an airplane control device, and a coupling comprising a member fixed to the stylus-carrying shaft, and a sleeve rotatable on the shaft which is supported by the mounting plate, a spring between the sleeve and the shaft carried by the mounting plate for rotating the stylus-carrying shaft to press the stylus against the chart, and a device for detachably locking said member and shaft together for axial movement.

6. In an instrument for recording the movements of the control surfaces of an airplane in flight, the combination with recording mechanism comprising a drum for supporting a movable chart, a stylus for marking the chart, a supporting base and frame for the recording mechanism, and a slidable stylus-carrying shaft mounted in the frame to slide longitudinally of the drum, of a mounting plate, means for detachably securing the mounting plate in fixed relation to the base and frame, a shaft slidably supported by the mounting plate and shiftable by an airplane control device, a coupling sleeve fixed to the stylus-carrying shaft, a stud on the shaft supporting the mounting plate, a coupling sleeve rotatable on the stud, and means for detachably locking the sleeves together for axial movement, and a spring between the stud and the sleeve mounted thereon for rotating the stylus-carrying shaft to press the stylus against the chart.

7. An instrument for recording the performance of an airplane in flight comprising: means for supporting a movable chart; and means for producing a record on such chart of the transverse inclinations of the airplane in flight while making a turn, said means being responsive to gravity by transverse inclinations and rendered non-responsive to gravity by centrifugal force when a turn is made at the predetermined speed which prevents skidding of the airplane.

8. An instrument for recording the performance of an airplane in flight comprising: means for supporting a movable chart; means for producing a record on said chart of the transverse inclinations of the airplane in flight while making a turn, said means being responsive to gravity by transverse inclinations during flight and rendered non-responsive to gravity by centrifugal force when a turn is made at the predetermined speed which prevents skidding of the airplane; and means for producing a record on the chart of the positions of the lateral control surfaces while making the turn.

9. An instrument for recording the performance of an airplane in flight comprising: means for supporting a movable chart; and means for producing a record on such chart of the transverse inclinations of the airplane in flight while making a turn, said means comprising a pair of pendulums responsive to gravity by opposite transverse inclinations, respectively, and alternately rendered non-responsive to gravity by centrifugal force when a turn is made at the predetermined speed which prevents skidding of the airplane.

10. An instrument for recording the performance of an airplane in flight comprising, means for supporting a movable chart and means for producing a record on said chart of the transverse inclinations of the airplane in flight while making a turn, said means comprising a pair of pendulums, means for holding the pendulums against movement in one of two opposite directions when the airplane is level transversely, the pendulums being responsive to gravity in opposite directions, respectively, one of the pendulums being responsive to centrifugal force to hold it against the holding means while the other is responsive to centrifugal force to overcome gravity when a turn is made in one direction.

11. An instrument for recording the performance of an airplane in flight comprising, means for supporting a movable chart and means for producing a record on said chart of the transverse inclinations of the airplane in flight while making a turn, said means comprising a pair of pendulums, means for holding the pendulums against movement in one of two opposite directions when the airplane is level transversely, the pendulums being responsive to gravity in opposite directions, respectively, one of the pendulums being responsive to centrifugal force to hold it against the stop means while the other is responsive to centrifugal force to overcome gravity when a turn is made in one direction, and means for producing a record on the chart of the positions of the lateral control surfaces while making the turn.

WILLIAM S. REDHED.